United States Patent
Shimizu et al.

(10) Patent No.: US 10,115,425 B2
(45) Date of Patent: Oct. 30, 2018

(54) MAGNETIC RECORDING MEDIUM FOR MICROWAVE ASSISTED RECORDING AND MAGNETIC RECORDING DEVICE

(71) Applicant: FUJIFILM Corporation, Tokyo (JP)

(72) Inventors: Osamu Shimizu, Minami-ashigara (JP); Tatsuo Mikami, Minami-ashigara (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/498,732

(22) Filed: Apr. 27, 2017

(65) Prior Publication Data

US 2017/0316799 A1   Nov. 2, 2017

(30) Foreign Application Priority Data

Apr. 28, 2016   (JP) .................................. 2016-092004

(51) Int. Cl.
| | | |
|---|---|---|
| *G11B 5/012* | (2006.01) | |
| *G11B 5/706* | (2006.01) | |
| *G11B 5/09* | (2006.01) | |
| *G11B 5/00* | (2006.01) | |

(52) U.S. Cl.
CPC .......... *G11B 5/70626* (2013.01); *G11B 5/012* (2013.01); *G11B 5/09* (2013.01); *G11B 2005/0024* (2013.01)

(58) Field of Classification Search
None
See application file for complete search history.

(56) References Cited

U.S. PATENT DOCUMENTS

| | | | | |
|---|---|---|---|---|
| 8,027,110 B1* | 9/2011 | Yamanaka | ............. | G11B 5/314 360/31 |
| 8,947,984 B2* | 2/2015 | Hattori | ............... | G11B 5/70642 369/13.14 |
| 2001/0033947 A1* | 10/2001 | Sasaki | .................... | G11B 5/848 428/837 |
| 2006/0068196 A1* | 3/2006 | Suenaga | ................... | H01F 1/22 428/328 |
| 2007/0253106 A1* | 11/2007 | Sato | ........................ | G11B 5/02 360/125.02 |

(Continued)

FOREIGN PATENT DOCUMENTS

| | | | |
|---|---|---|---|
| JP | 02218013 A | * | 8/1990 |
| JP | 2001283423 A | * | 10/2001 |

OTHER PUBLICATIONS

Ikuya Tagawa et al., "Advantages of MAMR Read-Write Performance", The 26th Magnetic Recording Conference TMRC TMRC2015-D6, pp. 067-068.

(Continued)

*Primary Examiner* — William J Klimowicz
(74) *Attorney, Agent, or Firm* — Sughrue Mion, PLLC (57) ABSTRACT

Provided is a coating-type magnetic recording medium for microwave assisted recording. A magnetic recording medium for microwave assisted recording having a magnetic layer including ferromagnetic powder and a binder on a non-magnetic support, in which the magnetic layer exhibits an intrinsic ferromagnetic resonance frequency of 30.0 GHz or more. A magnetic recording device including the magnetic recording medium and a magnetic head for microwave assisted recording.

8 Claims, 1 Drawing Sheet

(56) References Cited

U.S. PATENT DOCUMENTS

| | | | | |
|---|---|---|---|---|
| 2009/0080109 A1* | 3/2009 | Fukuzawa | ............. | B82Y 10/00 360/122 |
| 2010/0073804 A1* | 3/2010 | Ikeda | ................... | G11B 5/1278 360/59 |
| 2010/0208379 A1* | 8/2010 | Ikeda | ..................... | G11B 5/314 360/59 |
| 2011/0134561 A1* | 6/2011 | Smith | ................. | G11B 5/1278 360/59 |
| 2012/0113540 A1* | 5/2012 | Zhang | ................. | G11B 5/1278 360/59 |
| 2012/0243117 A1* | 9/2012 | Aoyama | ................. | G11B 5/02 360/59 |
| 2013/0070361 A1* | 3/2013 | Yang | ........................ | G11B 5/66 360/55 |
| 2013/0148242 A1* | 6/2013 | Koui | ................... | G11B 5/1278 360/125.12 |
| 2013/0258514 A1* | 10/2013 | Kobayashi | ............. | G11B 5/314 360/46 |
| 2013/0258527 A1* | 10/2013 | Soeno | ................... | G11B 5/486 360/234.5 |
| 2014/0340781 A1* | 11/2014 | Ajioka | .................. | G11B 5/012 360/59 |
| 2014/0340782 A1* | 11/2014 | Ajioka | .................. | G11B 11/10 360/59 |

OTHER PUBLICATIONS

Y. Nozaki et al., "Microwave-assisted magnetization reversal in 0.36-μm-wide Permalloy wires", Applied Physics Letters 91, 2007, 122505, doi: 10.1063/1.2786593.

Rie Sato et al., "Simulations and Experiments Toward High-Data-Transfer-Rate Readers Composed of a Spin-Torque Oscillator", IEEE Transactions on Magnetics, May 2012, pp. 1758-1764, vol. 48, No. 5.

T. Yang et al., "Layer-resolved readout of magnetic signals using ferromagnetic resonance effect", Journal of Magnetism and Magnetic Materials 332, 2013, pp. 52-55.

* cited by examiner

MAGNETIC RECORDING MEDIUM FOR MICROWAVE ASSISTED RECORDING AND MAGNETIC RECORDING DEVICE

CROSS-REFERENCE TO RELATED APPLICATIONS

This application claims priority under 35 U.S.C 119 to Japanese Patent Application No. 2016-092004 filed on Apr. 28, 2016. The above application is hereby expressly incorporated by reference, in its entirety.

BACKGROUND OF THE INVENTION

1. Field of the Invention

The present invention relates to a magnetic recording medium for microwave assisted recording and a magnetic recording device.

2. Description of the Related Art

In response to an increase in the amount of information, there is a demand for increasing the recording density of magnetic recording media at all times. In order to increase the recording density, it is effective to decrease the particle sizes (hereinafter, referred to as "particle miniaturization") of ferromagnetic powder included in magnetic layers in magnetic recording media. However, as the particles of ferromagnetic powder are miniaturized, the thermal stability of magnetization degrades, and record-holding properties degrade due to so-called thermal fluctuation.

Hereinafter, what has been described above will be further described. As an index regarding the thermal stability of magnetization, "KuV/kT" is known. Ku represents the anisotropic constant of ferromagnetic powder, V represents the particle volume, k represents the Boltzmann constant, and T represents the absolute temperature. When magnetic energy KuV is increased relative to thermal energy kT, that is, the value of "KuV/kT" is increased, it is possible to suppress the influence of thermal fluctuation (that is, the thermal stability of magnetization improves). However, the particle volume V is supposed to be decreased in order to increase the recording density. Since magnetic energy is the product of Ku and V, in order to increase magnetic energy in regions having a small V, it becomes necessary to increase Ku. However, ferromagnetic powder having a high Ku has a high coercive force Hc due to an increase in a switching magnetic field necessary for magnetization inversion, a strong external magnetic field is required for recording, and the property of easy writing degrades.

As described above, it is extremely difficult to satisfy three characteristics of an increase of the recording density, the thermal stability of magnetization, and the property of easy writing. This is referred to as the trilemma of magnetic recording and, in the future, causes a significant problem in increasing the recording density.

Meanwhile, magnetic recording media are roughly classified into two types of recording media such as metallic thin film-type recording media and coating-type (particulate) recoding media. Examples of magnetic recording devices in which a metallic thin film-type magnetic recording medium is mounted include hard disk drives (HDD). Regarding HDD, as means for solving the trilemma, a recording method in which the property of easy writing is improved by applying microwave magnetic fields from magnetic heads during the recording of information (microwave assisted recording) is proposed (for example, refer to Ikuya Tagawa, Masato Shiimoto, Shuya Nosaki, Jun Aoyama and Yosuke Urakami, "Advantage of MAMR Read-Write Performance," The 26th Magnetic Recording Conference TMRC TMRC2015-D6, pp. 067-068, Y. Nozaki, K. Tateishi, S. Taharazako, M. Ohta, S. Yoshimura, and K. Matsuyama, Applied Physics Letters, 91, 122505 (2007); doi: 10.1063/1.2786593, Rie Sato, Kiwamu Kudo, Tazumi Nagasawa, Hirofumi Suto, and Koichi Mizushima, "Simulations and Experiments Toward High-Data-Transfer-Rate Readers Composed of a Spin-Torque Oscillator," IEEE Trans. Magn., vol. 48, no. 5, pp. 1758-1764 (2012), and T. Yang, H. Suto, T. Nagasawa, K. Kudo, K. Mizushima, R. Sato, "Journal of Magnetism and Magnetic Materials" 332 (2013), pp. 52-55). In contrast, regarding the coating-type magnetic recording media, there have been no reports about an example of the application of microwave assisted recording.

SUMMARY OF THE INVENTION

Metallic thin film-type magnetic recording media are magnetic recording media having a metallic thin film magnetic layer formed by means of vapor deposition or the like. In contrast, coating-type magnetic recording media are magnetic recording media having a magnetic layer including ferromagnetic powder together with a binder. Coating-type magnetic recording media have superior chemical durability to metallic thin film-type magnetic recording media and are thus useful magnetic recording media as data storage media for storing a large amount of information for a long period of time. When microwave assisted recording can be applied to useful coating-type magnetic recording media as described above, it becomes possible to overcome the trilemma and provide large-capacity data storage media in which the recording density is further increased.

Therefore, an object of the present invention is to provide a coating-type magnetic recording medium for microwave assisted recording.

As a result of repeating intensive studies in order to achieve the above-described object, the present inventors newly found a magnetic recording medium for microwave assisted recording comprising: a magnetic layer including ferromagnetic powder and a binder on a non-magnetic support, in which the magnetic layer exhibits an intrinsic ferromagnetic resonance frequency of 30.0 GHz or more (hereinafter, also referred to simply as "magnetic recording medium").

The magnetic recording medium is a magnetic recording medium having a magnetic layer including ferromagnetic powder and a binder on a non-magnetic support, that is, a coating-type magnetic recording medium and is a magnetic recording medium capable of recording information by means of microwave assisted recording.

Ferromagnetic resonance refers to a phenomenon of the significant precession of magnetic moments (electron spin) in a ferromagnetic body due to the application of a microwave magnetic field that is equal to the intrinsic frequency. In the present invention and the present specification, the "intrinsic ferromagnetic resonance frequency" of the magnetic layer refers to the absorption peak frequency of the magnetic layer which is measured using a vector network analyzer (VNA) when the magnetization of the magnetic layer is saturated by applying an external magnetic field that is equal to or greater than the saturation magnetic field in the same direction as the magnetization direction which needs to be inverted and then the applied magnetic field is removed. Expression regarding directions in the present invention and the present specification such as the above-described "same direction" includes error ranges that are permissible in technical fields to which the present invention belongs. For example, regarding errors, angular errors of approximately ±30° from the exact direction are considered to be permitted. In addition, here, "magnetization direction" refers to an average magnetization direction of magnetization directions of individual particles of ferromagnetic powder (ferromagnetic particles) included in the magnetic layer. For example, in a case in which an alignment treatment is carried out on the magnetic layer during the manufacturing of a magnetic recording medium, generally, the direction of a magnetic field that is applied to the magnetic layer in the alignment treatment becomes the average magnetization direction of the magnetization directions of individual particles. As the vector network analyzer, it is possible to use, for example, a well-known vector network analyzer such as MS4647B manufactured by Anritsu Corporation. In addition, as a cable and/or a prober for connecting the magnetic layer and the vector network analyzer during measurement, members which are not affected by the magnetic field even when disposed in the magnetic field, that is, members constituted of a non-magnetic member are used. Regarding a method for measuring the absorption peak frequency in which the vector network analyzer is used, for example, Y. Nozaki, K. Tateishi, S. Taharazako, M. Ohta, S. Yoshimura, and K. Matsuyama, Applied Physics Letters, 91, 122505 (2007); doi: 10.1063/1.2786593 can be referred to. In addition, it is also possible to refer to the description of examples described below.

In the present invention and the present specification, "microwaves" refer to electromagnetic waves having a frequency of 300 MHz to 300 GHz. "Microwave assisted recording" refers to a recording method for recording information by assisting the magnetization inversion of ferromagnetic powder by means of the application of a microwave magnetic field to the magnetic layer.

Another aspect of the present invention relates to a magnetic recording device comprising the above-described magnetic recording medium and a magnetic head for microwave assisted recording.

In an embodiment, the ferromagnetic powder is metallic oxide powder.

In an embodiment, the metallic oxide powder is ferrite powder.

In an embodiment, the magnetic layer is a single layer of a magnetic layer exhibiting two or more different intrinsic ferromagnetic resonance frequencies of 30.0 GHz or more.

In an embodiment, the magnetic head for microwave assisted recording records two or more different types of information on the single layer of the magnetic layer exhibiting two or more different intrinsic ferromagnetic resonance frequencies of 30.0 GHz or more by means of microwave assisted recording including application of a microwave magnetic field of two or more different frequencies to the magnetic layer. "Two or more different types of information" refers to two or more mutually independent information groups.

In an embodiment, the intrinsic ferromagnetic resonance frequency exhibited by the magnetic layer is in a range of 30.0 to 50.0 GHz.

According to an aspect of the present invention, it becomes possible to apply microwave assisted recording to coating-type magnetic recording media.

DESCRIPTION OF THE PREFERRED EMBODIMENTS

[Magnetic Recording Medium for Microwave Assisted Recording]

An aspect of the present invention relates to a magnetic recording medium for microwave assisted recording having a magnetic layer including ferromagnetic powder and a binder on a non-magnetic support, and the magnetic layer exhibits an intrinsic ferromagnetic resonance frequency of 30.0 GHz or more.

Hereinafter, the magnetic recording medium will be described in more detail.

<Magnetic Layer>

(Intrinsic Ferromagnetic Resonance Frequency)

The intrinsic ferromagnetic resonance frequency exhibited by the magnetic layer is 30.0 GHz or more. Magnetic layers exhibiting an intrinsic ferromagnetic resonance frequency of 30.0 GHz or more are capable of recording information by assisting magnetization inversion using a microwave magnetic field. That is, the magnetic layers are capable of microwave assisted recording. In addition, magnetic layers exhibiting an intrinsic ferromagnetic resonance frequency of 30.0 GHz or more have a tendency of being not easily affected by thermal fluctuation and have excellent thermal stability, and thus the fact that magnetic layers exhibit an intrinsic ferromagnetic resonance frequency of 30.0 GHz or more is preferred in terms of improving recording-holding properties. The intrinsic ferromagnetic resonance frequency exhibited by the magnetic layer is 30.0 GHz or more and may be, for example, 50.0 GHz or less or 40.0 GHz or less. However, since magnetic layers exhibiting a higher intrinsic ferromagnetic resonance frequency have more favorable record-holding properties, the intrinsic ferromagnetic resonance frequency of the magnetic layer may be more than 50.0 GHz or more than 40.0 GHz. The details of the intrinsic ferromagnetic resonance frequency exhibited by the magnetic layer will be further described below.

The intrinsic ferromagnetic resonance frequency of the magnetic layer can be controlled using the coercive force Hc of the ferromagnetic powder included in the magnetic layer. Magnetic layers including ferromagnetic powder having a higher coercive force Hc have a tendency of exhibiting a higher intrinsic ferromagnetic resonance frequency. The details of the coercive force Hc and the like of the ferromagnetic powder will be described below.

(Ferromagnetic Powder)

The magnetic recording medium is a coating-type magnetic recording medium and has a magnetic layer including ferromagnetic powder and a binder. Examples of the ferromagnetic powder include hexagonal ferrite, the powder of a metallic oxide such as ε-iron oxide, metal powder, alloy powder of FePt, NdFeB, and the like, the powder of a nitride such as $Fe_{16}N_2$, and the like. Generally, the intrinsic ferromagnetic resonance frequency of the magnetic layer has a tendency of increasing as the coercive force Hc of the ferromagnetic powder included in the magnetic layer. In the aspect, the coercive force Hc of the ferromagnetic powder is preferably 210 kA/m or more. The coercive force Hc of the ferromagnetic powder can be, for example, 20,000 kA/m or less. However, the coercive force may be more than 20,000 kA/m. Generally, ferromagnetic powder having a higher coercive force Hc has a tendency of having a higher anisotropic constant Ku and being more preferred from the viewpoint of thermal stability (record-holding properties). The coercive force Hc of the ferromagnetic powder is a value obtained under a measurement environment of a temperature of 20° C. to 25° C. using a well-known magnetic characteristic measurement instrument such as a vibrating sample-type magnetic flux meter.

The miniaturization of the ferromagnetic powder included in the magnetic layer is preferred from the viewpoint of increasing the recording density. Regarding the particle sizes of the ferromagnetic powder, the average particle size of the ferromagnetic powder which is an index of the physical particle size is preferably 50 nm or less, more preferably 40 nm or less, still more preferably 35 nm or less, far still more preferably 30 nm or less, far still more preferably 25 nm or less, and most preferably 20 nm or less from the viewpoint of increasing the recording density. On the other hand, from the viewpoint of the magnetization stability, the average particle size of the ferromagnetic powder is preferably 5 nm or more and more preferably 7 nm or more.

In the present invention and the present specification, the "average particle size" of a variety of powder such as ferromagnetic powder is considered as a value measured using a transmission electron microscope and the following method.

An image of powder is captured using a transmission electron microscope at an image-capturing magnification of 100,000 times and is printed on photographic paper so that the total magnification reaches 500,000 times, thereby obtaining a photograph of particles constituting the powder. Target particles are selected from the obtained photograph of the particles, the contours of the particles are traced using a digitizer, and the sizes of the particles (primary particles) are measured. The primary particles refer to independent particles that do not agglomerate.

The above-described measurement is carried out on 500 randomly-extracted particles. The arithmetic average of the particle sizes of the 500 particles obtained in the above-described manner is considered as the average particle size of the powder. As the above-described transmission electron microscope, it is possible to use, for example, a H-9000-type transmission electron microscope manufactured by Hitachi, Ltd. In addition, the particle sizes can be measured using well-known image-processing software, for example, image-processing software KS-400 manufactured by Carl Zeiss.

In the present invention and the present specification, the average particle sizes of the ferromagnetic powder and other powders refer to average particle sizes obtained using the above-described method.

As a method for collecting sample powder from the magnetic recording medium in order for particle size measurement, it is possible to employ, for example, the method described in Paragraph 0015 of JP2011-48878A.

In the present invention and the present specification, the sizes (particle sizes) of the particles constituting the powder are expressed by (1) the lengths of long axes constituting the particles, that is, long-axis lengths in a case in which the shapes of the particles observed in the above-described photograph of particles are needle shapes, spindle shapes, column shapes (here, the heights need to be larger than the maximum long diameter of the bottom surface), or the like, (2) the maximum long diameter of the plate surface or the bottom surface in a case in which the shapes of the particles are plate shapes or column shapes (here, the thickness or the height needs to be smaller than the maximum long diameter of the plate surface or the bottom surface), and (3) the circle-equivalent diameter in a case in which the shapes of the particles are spherical shapes, polyhedral shapes, unspecified shapes, or the like and it is not possible to specify long axes constituting the particles from the shapes. The circle-equivalent diameter refers to a diameter obtained using a circle projection method.

In addition, the average needle shape ratio of the powder refers to the arithmetic average of the (long-axis length/short-axis length) values of the above-described 500 particles which are obtained by measuring the lengths of the short axes, that is, the short-axis lengths of the particles in the above-described measurement. Here, unless particularly otherwise described, the short-axis length is considered as the length of the short axis constituting the particle in the case of (1) in the definition of the particle sizes, similarly, the thickness or the height in the case of (2), and (the long axis length/the short axis length) is considered as one for convenience in the case of (3) since there are no discrimination between the long axis and the short axis.

In addition, unless particularly otherwise described, in a case in which the shapes of the particles are specified, for example, in the case of (1) in the definition of the particle sizes, the average particle size is the average long-axis length, and, in the case of (2) in the same definition, the average particle size is the average plate diameter, and the average plate shape ratio is the arithmetic average of (the maximum long diameter/the thickness or the height). In the case of (3) in the same definition, the average particle size is the average diameter (also referred to as the average grain diameter or the average particle diameter).

In the present invention and the present specification, the ferromagnetic powder refers to the collection of a plurality of ferromagnetic particles. The collection is not limited to an aspect in which particles constituting the collection are in direct contact with each other and may also be an aspect in which a binder, an additive, and the like are interposed between the particles. What has been described above shall apply to a variety of powders in the present invention and the present specification such as non-magnetic powder.

The content (filling percentage) of the ferromagnetic powder in the magnetic layer is preferably in a range of 50% to 90% by mass and more preferably in a range of 60% to 90% by mass. At least a binder is included as a component other than the ferromagnetic powder in the magnetic layer, and one or more additives may be arbitrarily included. The filling percentage of the ferromagnetic powder in the magnetic layer is preferably high from the viewpoint of improving the recording density.

As the ferromagnetic powder, ferromagnetic powder capable of exhibiting high thermal stability even when the particles thereof are miniaturized in order to increase the recording density is preferably used. From this viewpoint, the ferromagnetic powder included in the magnetic layer is preferably metallic oxide powder and, among metallic oxide powders, more preferably ferrite powder. Examples of the ferrite powder include a variety of ferrite powders such as hexagonal ferrite powder and ε-iron oxide powder, and hexagonal ferrite powder and ε-iron oxide powder are preferred.

Regarding hexagonal ferrite powder, as the crystal structure of hexagonal ferrite, magnetoplumbite-type crystal structure (also referred to as "M-type crystal structure"), W-type crystal structure, Y-type crystal structure, and Z-type crystal structure are known. Hexagonal ferrite powder that can be used as the ferromagnetic powder in the magnetic layer may have any crystal structure. The coercive force Hc of the hexagonal ferrite powder can be controlled using, for example, the types and compositional fractions of atoms constituting the crystal structure of hexagonal ferrite. For example, unsubstituted M-type hexagonal ferrite including no substitutional atoms is expressed by a compositional formula: $AFe_{12}O_{19}$. M-type hexagonal ferrite powder that is widely used in the magnetic recording field is substituted M-type hexagonal ferrite in which some of Fe atoms in the above-described compositional formula are substituted with other atoms (substitutional atoms). The above-described substituted hexagonal ferrite has a tendency of exhibiting a lower coercive force Hc than unsubstituted hexagonal ferrite. Examples of the substitutional atoms include niobium atom (Nb), cobalt atom (Co), titanium atom (Ti), zinc atom (Zn), and the like. However, the substitutional atoms are not limited thereto. Meanwhile, in the above-described compositional formula, A represents a divalent metal atom. The divalent metal atom refers to a metal atom capable of turning into a divalent cation as an ion, and examples thereof include alkaline-earth metal atoms such as a barium atom, a strontium atom, and a calcium atom, a lead atom, and the like. Meanwhile, two or more types of divalent metal atoms may be included as A. For example, hexagonal ferrite including a barium atom and a strontium atom as A is a mixed crystal of barium ferrite and strontium ferrite.

As a method for manufacturing the hexagonal ferrite powder, a glass crystallization method, a coprecipitation method, a reverse micelle method, a hydrothermal method, and the like are known. The above-described manufacturing methods are all well known. The method for manufacturing the hexagonal ferrite powder that can be used as the ferromagnetic powder in the magnetic layer is not limited.

Meanwhile, regarding the ε-iron oxide powder, the coercive force Hc can be controlled by substituting some of iron atoms (Fe) constituting the crystal structure with a substitutional atom such as Ga, Al, or Rh. Regarding a method for manufacturing the ε-iron oxide powder in which some of Fe atoms are substituted with the substitutional atoms, it is possible to refer to, for example, J. Jpn. Soc. Powder Metallurgy Vol. 61 Supplement, No. S1, pp. S280-S284, J. Mater. Chem. C, 2013, 1, pp. 5200-5206 and the like. However, the ε-iron oxide powder that can be used as the ferromagnetic powder in the magnetic layer is not limited to s-iron oxide powder that can be obtained using the method described in the above-described document. As a method for manufacturing the ε-iron oxide powder, a method in which ε-iron oxide powder is produced from goethite, a reverse micelle method, and the like are known. The above-described manufacturing methods are all well known. The method for manufacturing the s-iron oxide powder that can be used as the ferromagnetic powder in the magnetic layer is not limited.

(Binder and Curing Agent)

The magnetic layer includes a binder together with the ferromagnetic powder. The binder is one or more types of resins, and the resins may be homopolymers or copolymers. As the binder that is included in the magnetic layer, it is possible to use one resin or a mixture of a plurality of resins selected from polyurethane resins, polyester resins, polyamide resins, vinyl chloride resins, acrylic resins obtained by copolymerizing styrene, acrylonitrile, methyl methacrylate, or the like, cellulose resins such as nitrocellulose, epoxy resins, phenoxy resins, polyvinyl alkyral resins such as polyvinyl acetal and polyvinyl butyral. Among these, polyurethane resins, acrylic resins, cellulose resins, and vinyl chloride resins are preferred. These resins can also be used as a binder in a non-magnetic layer and/or a backcoat layer which will be described below. Regarding the above-described binder, it is possible to refer to Paragraphs 0029 to 0031 of JP2010-24113A. As the average molecular weight of the resin that is used as the binder, the weight-average molecular weight can be, for example, 10,000 or more and 200,000 or less. Meanwhile, the weight-average molecular weight in the present invention and the present specification refers to a value which is measured by means of gel permeation chromatography (GPC) and is obtained by means of the standard polystyrene conversion. As the measurement conditions, the following conditions can be exemplified.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, in the formation of the magnetic layer, it is also possible to use a curing agent together with a resin that can be used as the binder. The curing agent can be a thermosetting compound that is a compound of which a curing reaction (crosslinking reaction) proceeds by heating in one aspect and can be a light-curable compound of which a curing reaction (crosslinking reaction) proceeds by light irradiation in other aspects. A preferred curing agent is a thermosetting compound, and polyisocyanate is preferred. Regarding the detail of the polyisocyanate, it is possible to refer to Paragraphs 0124 and 0125 of JP2011-216149A. The amount of the curing agent added to a composition for forming the magnetic layer is, for example, 0 to 80.0 parts by mass and preferably 50.0 to 80.0 parts by mass from the viewpoint of improving the strength of the magnetic layer with respect to 100.0 parts by mass of the binder.

(Additives)

The magnetic layer may include one or more types of additives as necessary. An example of the additives is the above-described curing agent. Meanwhile, the curing agent can be included in the magnetic layer in a state in which at least some of the curing agent reacts (forms a crosslink) with other components such as the binder since a curing reaction proceeds in a magnetic layer-forming step. In addition, examples of the additives that can be included in the magnetic layer include non-magnetic powder capable of functioning as an abrading agent or a protrusion-forming agent, a lubricant, a dispersant, a dispersion aid, an antibacterial agent, an antistatic agent, an antioxidant, carbon black, and the like. As the additives, commercially available products can be appropriately selected and used depending on desired properties.

<Non-Magnetic Layer>

Next, the non-magnetic layer will be described.

The magnetic recording medium may directly have the magnetic layer on a non-magnetic support or may have a non-magnetic layer including non-magnetic powder and a binder between a non-magnetic support and the magnetic layer. The non-magnetic powder included in the non-magnetic layer may be inorganic powder or organic powder. In addition, carbon black or the like can also be used. Examples of the inorganic powder include powders of metal, metallic oxides, metallic carbonates, metallic sulphates, metallic nitrides, metallic carbides, metallic sulphides, and the like. These non-metallic powder can be procured from commercially available products or can be manufactured using a well-known method. Regarding the details thereof, it is possible to refer to Paragraphs 0036 to 0039 of JP2010-24113A.

Regarding the details of the binder in the non-magnetic layer, the additives which may be arbitrarily included, and the like, it is possible to apply well-known techniques regarding the magnetic layer and/or the non-magnetic layer. In addition, it is also possible to add carbon black and/or organic powder to the non-magnetic layer. Regarding what has been described above, it is possible to refer to, for example, Paragraphs 0040 to 0042 of JP2010-24113A.

<Non-Magnetic Support>

Examples of the non-magnetic support (hereinafter, also referred to simply as "support") include well-known supports obtained by biaxially stretching polyethylene terephthalate, polyethylene naphthalate, polyamide, polyamideimide, aromatic polyamide, or the like. Among these, polyethylene terephthalate, polyethylene naphthalate, and polyamide are preferred.

On these supports, corona discharging, a plasma treatment, an easy adhesion treatment, a thermal treatment, or the like may be carried out in advance.

<Thicknesses of Non-Magnetic Support and Individual Layers>

Regarding the thicknesses of the non-magnetic support and individual layers, the thickness of the non-magnetic support is preferably 3 to 80 µm. The thickness of the magnetic layer can be optimized using the saturated magnetization amount of magnetic heads being used, head gap lengths, the bandwidth of recording signals, and the like. The thickness of the magnetic layer is generally 5 to 200 nm, preferably 10 to 120 nm, and more preferably 10 to 30 nm.

In the aspect, the magnetic recording medium can be a magnetic recording medium including only one layer of the magnetic layer (that is, having a single layer of the magnetic layer). In this case, the single layer of the magnetic layer may exhibit only one intrinsic ferromagnetic resonance frequency of 30.0 GHz or more or may exhibit two or more intrinsic ferromagnetic resonance frequencies of 30.0 GHz or more. For example, when the magnetic layer is formed using ferromagnetic powder collected from two types of ferromagnetic powder rods having different coercive forces Hc, it is possible to obtain coating-type magnetic recording media having a single layer of the magnetic layer exhibiting two intrinsic ferromagnetic resonance frequencies of 30.0 GHz or more. In addition, according to microwave assisted recording, it becomes possible to record (that is, multiplex-record) two or more different types of information on the single layer of the magnetic layer using the fact that the single layer of the magnetic layer exhibits two intrinsic ferromagnetic resonance frequencies of 30.0 GHz or more. This will be further described below.

Hereinafter, a case in which a single layer of a magnetic layer exhibits intrinsic ferromagnetic resonance frequencies $\alpha$ and $\beta$ ($\alpha \neq \beta$) of 30.0 GHz or more and this single layer of the magnetic layer includes two types of ferromagnetic powder such as ferromagnetic powder in which magnetization inversion is assisted by applying a microwave magnetic field of a frequency A (hereinafter, referred to as "ferromagnetic powder $\alpha$"); and ferromagnetic powder in which magnetization inversion is assisted by applying a microwave magnetic field of a frequency B (hereinafter, referred to as "ferromagnetic powder $\beta$") will be described as an example. The intrinsic ferromagnetic resonance frequency $\alpha$ is generated by the ferromagnetic powder $\alpha$, and the intrinsic ferromagnetic resonance frequency $\beta$ is generated by the ferromagnetic powder $\beta$. Generally, the ferromagnetic powder $\alpha$ and the ferromagnetic powder $\beta$ are ferromagnetic powder collected from ferromagnetic powder rods having different coercive forces Hc. The microwave magnetic fields are applied in a direction opposite to the magnetization direction before the magnetization inversion in order to assist magnetization inversion. The values of the frequencies of the microwave magnetic fields are dependent on the magnetic field intensities of the microwave magnetic fields, and the frequencies decrease as the magnetic field intensities increase. The ferromagnetic powder $\alpha$ and the ferromagnetic powder $\beta$ have different frequencies at which magnetization inversion is assisted. In order to assist magnetization inversion in the ferromagnetic powder $\alpha$, a microwave magnetic field of preferably the intrinsic ferromagnetic resonance frequency $\alpha$ or lower and more preferably a frequency that is lower than the intrinsic ferromagnetic resonance frequency $\alpha$ is applied. In order to assist magnetization inversion in the ferromagnetic powder $\beta$, a microwave magnetic field of preferably the intrinsic ferromagnetic resonance frequency $\beta$ or lower and more preferably a frequency that is lower than the intrinsic ferromagnetic resonance frequency $\beta$ is applied. Therefore, the frequency A is preferably the intrinsic ferromagnetic resonance frequency $\alpha$ or lower and more preferably lower than $\alpha$. The frequency B is preferably the intrinsic ferromagnetic resonance frequency $\beta$ or lower and more preferably lower than $\beta$. A is not equal to B, and the application of the microwave magnetic field of the frequency A in order for assisting magnetization inversion in the ferromagnetic powder $\alpha$ does not assist magnetization inversion in the ferromagnetic powder $\beta$, and the application of the microwave magnetic field of the frequency B in order for assisting magnetization inversion in the ferromagnetic powder $\beta$ does not assist magnetization inversion in the ferromagnetic powder $\alpha$.

The use of the above-described properties enables the recording of two different types of information (hereinafter, referred to as "information $\alpha$" and "information $\beta$") on the single layer of the magnetic layer. This can be described in detail as below. When a recording magnetic field corresponding to "information $\alpha$" is applied to the magnetic layer including the ferromagnetic powder $\alpha$ and the ferromagnetic powder $\beta$, if the microwave magnetic field of the frequency A which is capable of assisting the magnetization inversion of the ferromagnetic powder $\alpha$ is applied, the magnetization inversion of the ferromagnetic powder $\alpha$ is assisted, and thus the magnetization inversion of the ferromagnetic powder $\alpha$ occurs, whereby the information $\alpha$ can be recorded in the ferromagnetic powder $\alpha$. Here, since the magnetization inversion of the ferromagnetic powder $\beta$ is not assisted, the information $\alpha$ is not recorded in the ferromagnetic powder $\beta$. On the other hand, when a recording magnetic field corresponding to "information $\beta$" is applied to the magnetic layer including the ferromagnetic powder $\alpha$ and the ferromagnetic powder $\beta$, if the microwave magnetic field of the frequency B which is capable of assisting the magnetization inversion of the ferromagnetic powder $\beta$ is applied, the magnetization inversion of the ferromagnetic powder $\beta$ is assisted, and thus the magnetization inversion of the ferromagnetic powder $\beta$ occurs, whereby the information $\beta$ can be recorded in the ferromagnetic powder $\beta$. Here, since the magnetization inversion of the ferromagnetic powder $\alpha$ is not assisted, the information $\beta$ is not recorded in the ferromagnetic powder $\alpha$. In the above-described manner, two different types of information can be multiplex-recorded on the single layer of the magnetic layer (the same magnetic layer).

In the above-described example, an example in which two different types of information is multiplex-recorded has been described. However, the multiplex-recorded information is not limited to two different types of information and may be three different types of information, four different types of information, or five or more different types of information (for example, five to ten different types of information). When microwave assisted recording is carried out by applying microwave magnetic fields of different frequencies, it is possible to multiplex-record a maximum of the same number of types of information as the number of intrinsic ferromagnetic resonance frequencies exhibited by the magnetic layer in the single layer of the magnetic layer. In contrast, in metallic thin film-type magnetic recording media, for a reason in terms of manufacturing that the magnetic layer is formed by means of vapor deposition or the like, it is difficult to form a single layer of a magnetic layer exhibiting two or more intrinsic ferromagnetic resonance frequencies. Therefore, in order to multiplex-record two or more different types of information in the same metallic thin film-type magnetic recording medium by means of microwave assisted recording, it is necessary to provide a multiple layer of two or more magnetic layers exhibiting different intrinsic ferromagnetic resonance frequencies. Therefore, another layer (magnetic layer) for recording needs to be formed in a location away from an element for recording and/or retrieving information. Generally, the above-described increase in distance (spacing) due to the magnetic layer located away from the element causes a decrease in recording density. In contrast, according to coating-type magnetic recording media, since multiplex recording in a single layer of a magnetic layer is enabled by microwave assisted recording as described above, it becomes possible to carry out multiplex recording by means of microwave assisted recording without causing an increase in recording density.

However, the magnetic recording medium according to the aspect of the present invention does not exclude aspects in which a multiple layer of two or more magnetic layers is provided. For example, in the magnetic recording medium according to the aspect of the present invention, the magnetic layer may be separated into two or more layers having different magnetic characteristics, and constitutions regarding well-known multiple layers of magnetic layers can be applied. Regarding the multiple layer of the magnetic layers, the thickness of the magnetic layers refers to the total thickness of a plurality of the magnetic layers. In this case, different magnetic layers may exhibit different intrinsic ferromagnetic resonance frequencies or may exhibit the same intrinsic ferromagnetic resonance frequency.

The thickness of the non-magnetic layer is, for example, 0.05 to 3.0 μm, preferably 0.1 to 2.0 μm, and more preferably 0.1 to 1.5 μm. In the present invention and the present specification, substantial non-magnetic layers including a small amount of ferromagnetic powder, for example, as impurities or intentionally together with non-magnetic powder are also considered as the "non-magnetic layer". Here, the "substantial non-magnetic layer" refers to a layer in which the residual flux density of this layer is 10 mT or less, the coercive force is 7.96 kA/m (100 Oe) or less, or the residual flux density is 10 mT or less and the coercive force is 7.96 kA/m (100 Oe) or less. The non-magnetic layer preferably does not have any residual flux density and coercive force.

<Backcoat Layer>

The magnetic recording medium may also have a backcoat layer on a side of the non-magnetic support opposite to the magnetic layer. The backcoat layer preferably contains carbon black and/or inorganic powder. Regarding a binder and a variety of additives for forming the backcoat layer, it is possible to apply well-known techniques regarding the magnetic layer, the non-magnetic layer, and the backcoat layer. The thickness of the backcoat layer is preferably 0.9 μm or less and more preferably 0.1 to 0.7 μm.

<Manufacturing Step>

Generally, a step for manufacturing compositions for forming the magnetic layer, the non-magnetic layer, and the backcoat layer includes at least a kneading step, a dispersion step, and mixing steps that are provided as necessary before and after the above-described steps. The respective steps may be divided into two or more stages. A variety of components may be added in the beginning or middle of any steps. In addition, a variety of components may be added in two or more separate steps. For example, the binder may be separately injected in the kneading step, the dispersion step, and the mixing step for adjusting the viscosity after dispersion. In order to manufacture the magnetic recording medium, well-known manufacturing techniques of the related art can be used in part or all of the steps. In the kneading step, a device having a strong kneading force such as an open kneader, a continuous kneader, a pressure kneader, or an extruder is preferably used. Regarding the details of these kneading treatments, it is possible to refer to JP1989-106338A (JP-H01-106338A) and JP1989-79274A (JP-H01-79274A). In addition, in order to disperse compositions for forming the respective layers, glass beads can be used as dispersion beads. in addition, the dispersion beads are also preferably zirconia beads, titania beads, or steel beads which are dispersion beads having a high specific weight. These dispersion beads can be used after optimizing the particle diameters and the filling percentage. As a disperser, a well-known disperser can be used.

Regarding the details of the method for manufacturing the magnetic recording medium, it is also possible to refer to, for example, Paragraphs 0051 to 0057 of JP2010-24113A.

The shape of the magnetic recording medium is not limited. The magnetic recording medium may be a tape-shaped magnetic recording medium (magnetic tape) or a disc-shaped magnetic recording medium (magnetic disc). In addition, as described in the following examples, a constitution in which a sliding portion with magnetic heads is not provided and a waveguide and the magnetic layer are integrally formed on the non-magnetic support (for example, a silicon substrate) may be employed.

The above magnetic recording medium can be used in a magnetic recording method in which microwave assisted recording is carried out on the above magnetic recording medium with a magnetic head for microwave assisted recording. Regarding the details of the above-described magnetic recording method, it is possible to refer to the following description of a magnetic recording device.

[Magnetic Recording Device]

An aspect of the present invention relates to a magnetic recording device including the above-described magnetic recording medium according to the aspect of the present invention and a magnetic head for microwave assisted recording.

Hereinafter, the magnetic recording device will be described in more detail.

<Magnetic Recording Medium>

The magnetic recording medium included in the magnetic recording device is the above-described magnetic recording medium according to the aspect of the present invention. The details thereof are as described above. According to the above-described magnetic recording device, it is possible to record information by means of microwave assisted recording in the magnetic recording medium according to the aspect of the present invention which is a coating-type magnetic recording medium.

<Magnetic Head for Microwave Assisted Recording>

The magnetic head for microwave assisted recording which is included in the magnetic recording device is not particularly limited, but needs to be capable of microwave assisted recording. According to microwave assisted recording, when a recording magnetic field corresponding to information to be recorded is applied to the magnetic layer, it is possible to invert the magnetization of the ferromagnetic powder and thus record the information by assisting the magnetization inversion of the ferromagnetic powder, the magnetization of which is not inverted by means of the application of the recording magnetic field, by means of the application of a microwave magnetic field. The above-described assistance of magnetization inversion can be realized by putting the ferromagnetic powder in the magnetic layer into a magnetic resonance state. In order for that, a microwave magnetic field of a frequency that is equal or close to the same frequency as the intrinsic ferromagnetic resonance frequency exhibited by the magnetic layer is preferably applied to the magnetic layer. When the intrinsic ferromagnetic resonance frequency exhibited by the magnetic layer is represented by "X" GHz, a microwave magnetic field of a frequency in a range of (X−15.0) GHz to X GHz is more preferably applied, and a microwave magnetic field of a frequency of (X−15.0) GHz or higher and lower than X GHz is still more preferably applied. In addition, in a case in which a single layer of the magnetic layer exhibits two or more different intrinsic ferromagnetic resonance frequencies other than 30.0 GHz, the different intrinsic ferromagnetic resonance frequencies are preferably different from each other by 5.0 GHz or more (for example, 5.0 GHz to 10.0 GHz) since multiplex recording is more favorable carried out.

The magnetic head for microwave assisted recording includes at least a recording portion, but may include a recording portion and a retrieving portion. The recording portion includes a magnetic pole facing a recording magnetic pole that generates a recording magnetic field and, furthermore, may have a constitution in which a microwave oscillation element that generates a microwave magnetic field is provided. The microwave magnetic field is preferably generated as an alternating-current magnetic field using direct currents, and the frequency of the alternating-current magnetic field is proportional to the current value of the direct currents. Therefore, the frequency of the microwave magnetic field being applied to the magnetic layer can be controlled by adjusting the current value of the direct currents. As the microwave oscillation element, a microwave oscillation element that applies magnetostatic fields may be used. Alternatively, dynamic recording may be carried out using a spin torque oscillator or the like. The number of the microwave oscillator elements included in the recording portion may be one or more. In a case in which microwave magnetic fields of two or more different frequencies are applied to the magnetic layer using the magnetic head for microwave assisted recording, the microwave magnetic fields of different frequencies may be applied at the same time or sequentially, but are preferably applied sequentially. In addition, the recorded information can be retrieved by, for example, measuring absorption peak frequencies as described in the following examples. Alternatively, it is also possible to use an element capable of detecting magnetic fields, for example, a Hall element, a magnetoresistive (MR) element, a giant-magnetoresistive (GMR) element, or a tunnel-magnetoresistive (TMR) element as the retrieving portion. In addition, in order to retrieve multiplex-recorded information, it is also possible to use, for example, a retrieving portion in which a spin torque oscillator is used. Regarding the retrieval of information using the spin torque oscillator, it is possible to refer to, for example, Rie Sato, Kiwamu Kudo, Tazumi Nagasawa, Hirofumi Suto, and Koichi Mizushima, "Simulations and Experiments Toward High-Data-Transfer-Rate Readers Composed of a Spin-Torque Oscillator," IEEE Trans. Magn., vol. 48, no. 5, pp. 1758-1764 (2012).

As recording methods for magnetic recording, regarding the recording of information in magnetic tape, there are vertical recording and longitudinal recording. In a case in which the ferromagnetic powder included in the magnetic layer is hexagonal ferrite powder, from the viewpoint of decreasing the influence of demagnetization attributed to demagnetizing fields, the axis of easy magnetization is preferably oriented in a direction vertical to the surface of the magnetic layer. Therefore, vertical recording is preferably carried out. Meanwhile, in a case in which the ferromagnetic powder included in the magnetic layer is ε-iron oxide powder, the axis of easy magnetization is preferably oriented in a direction vertical to the surface of the magnetic layer or is preferably oriented in the longitudinal direction. This is because ε-iron oxide powder magnetizes to a relatively smaller extent and has a relatively larger coercive force than hexagonal ferrite powder and thus there is a tendency that ε-iron oxide powder is not easily affected by demagnetization attributed to demagnetizing fields. Meanwhile, longitudinal recording has a tendency of being advantageous for output improvement.

As described above, according to the present invention, it becomes possible to record information by means of microwave assisted recording in coating-type magnetic recording media.

EXAMPLES

Hereinafter, the present invention will be further described on the basis of an example. However, the present invention is not limited to an aspect described in the example.

1. Ferromagnetic Powder

The following evaluation was carried out using four types of ferromagnetic powder shown in Table 1. The ferromagnetic powders shown in Table 1 are hexagonal ferrite powder produced using a glass crystallization method.

The coercive forces shown in Table 1 were measured at an applied magnetic field of 1,194 kA/m (15 kOe) using a vibrating sample-type magnetic flux meter (manufactured by Tohei Ind. Co., Ltd.).

TABLE 1

| Ferromagnetic powder No. | Coercive force Hc |
|---|---|
| A | 193 [kA/m] |
| B | 206 [kA/m] |
| C | 246 [kA/m] |
| D | 227 [kA/m] |

2. Production of Magnetic Recording Medium Samples

Magnetic recording medium samples No. 1 to 4 were produced using the following method.

Each of the hexagonal ferrite powders shown in Table 1 was added to and dispersed in an ultraviolet-curable resin composition (PHOTORESIST MICROPOSIT S1813G manufactured by Dow Corning Corporation) which is a binder-containing composition, thereby preparing a composition for forming the magnetic layer. The prepared composition for forming the magnetic layer was applied onto a thermally oxidized film-attached silicon substrate by means of spin coating (the thickness of the dried coating: 150 nm), a homeotropic alignment treatment was carried out by applying a magnetic field in a direction vertical to the coated surface, and then the coated surface was dried. After the drying, mask exposure and development were carried out so as to pattern a rectangular shape, thereby forming a magnetic layer.

3. Measurement of Intrinsic Ferromagnetic Resonance Frequencies

After a 100 nm-thick $SiO_2$ film was produced on the magnetic layer of the magnetic recording medium sample produced in the section 2 using a sputtering method and a planar waveguide was formed by laminating a 5 nm-thick Ti film and a 300 nm-thick Au film using a lift-off method.

Figure 1:
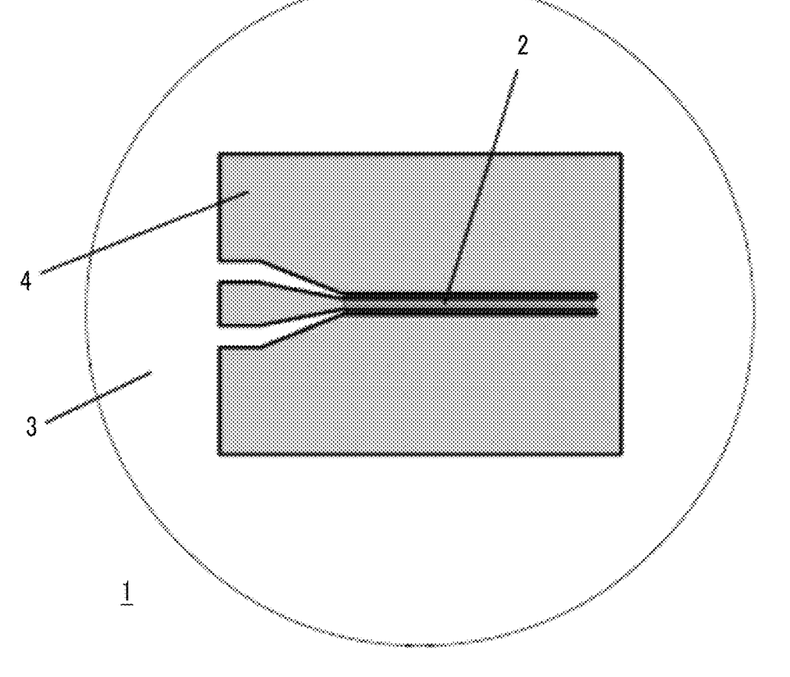
FIG. 1 is a schematic view of a magnetic recording medium sample produced in an example.

A schematic view of the magnetic recording medium sample in which the planar waveguide was formed in the above-described manner is illustrated in FIG. 1. A magnetic recording medium sample 1 illustrated in FIG. 1 has a magnetic layer 2 on a silicon substrate 3 and has a planar waveguide 4 formed therein.

The intrinsic ferromagnetic resonance frequency of the magnetic layer of each of the magnetic recording medium samples was measured using MS4647B manufactured by Anritsu as a vector network analyzer and non-magnetic members as a cable and a prober. The absorption peak frequencies described below were also measured in the same manner. The intrinsic ferromagnetic resonance frequency was obtained as the absorption peak frequency of the magnetic layer which was measured using the vector network analyzer when a magnetic field of 1,034.8 kA/m (13 kOe) was applied in a positive direction with the silicon substrate side of the magnetic layer in the thickness direction set as a negative direction and the other side set as the positive direction, the magnetization of the magnetic layer was saturated, and then the applied magnetic field was removed. The measured intrinsic ferromagnetic resonance frequencies are shown in Table 2.

TABLE 2

| Magnetic recording medium sample No. | Ferromagnetic powder No. | Intrinsic ferromagnetic resonance frequency [GHz] |
|---|---|---|
| 1 | A | 25.8 |
| 2 | B | 28.8 |
| 3 | C | 30.1 |
| 4 | D | 38.5 |

4. Microwave Assisted Recording into Magnetic Recording Medium Sample No. 3

When an external magnetic field of a magnetic field intensity that is equal to or less than the coercive force of the ferromagnetic powder in each of the magnetic recording medium samples shown in Table 2 is applied to the sample, in a case in which the external magnetic field and the magnetization direction of the ferromagnetic powder in the magnetic layer are in the same direction, the absorption peak frequency increases, and, in a case in which the external magnetic field and the magnetization direction are in directions opposite to each other, the absorption peak frequency decreases. That is, the magnetization direction (that is, whether or not magnetization inversion occurs) of the ferromagnetic powder can be confirmed on the basis of how the absorption peak frequency is changed from the intrinsic ferromagnetic resonance frequency by applying an external magnetic field that is equal to or less than the coercive force of the ferromagnetic powder in each of the magnetic recording medium samples. Specifically, whether or not magnetization inversion occurs was confirmed by applying a magnetic field (recording magnetic field) of a magnetic field intensity of 159.2 kA/m (2 kOe) in the negative direction after the magnetization of the magnetic layer in each of the magnetic recording medium samples was saturated by applying a magnetic field in the positive direction. As a result, in the magnetic recording medium sample No. 1 and the magnetic recording medium sample No. 2, magnetization inversion occurred in some of the ferromagnetic powder, and the absorption peak frequencies were confirmed at frequencies that were higher than the intrinsic ferromagnetic resonance frequencies. In contrast, in the magnetic recording medium sample No. 3 and the magnetic recording medium sample No. 4, magnetization inversion of the ferromagnetic powder did not occur, and the absorption peak frequencies were confirmed only at frequencies that were lower than the intrinsic ferromagnetic resonance frequencies.

Next, in the magnetic recording medium sample No. 3, after the magnetization of the magnetic layer was saturated by applying a magnetic field in the positive direction, a microwave magnetic field of a frequency of 26.5 GHz was applied for 100 ns (nanoseconds) through an amplifier in a state in which a magnetic field (recording magnetic field) of a magnetic field intensity of 159.2 kA/m (2 kOe) was applied in the negative direction. After that, as a result of measuring the absorption peak frequency of the magnetic layer, the measured absorption peak frequency was found to be 35.0 GHz which was a frequency higher than the intrinsic ferromagnetic resonance frequency (30.1 GHz) of the magnetic layer of the magnetic recording medium sample No. 3. From this fact, it can be confirmed that, in the magnetic recording medium sample No. 3 in which magnetization inversion (the recording of information) did not occur only by the application of the recording magnetic field of a magnetic field intensity of 159.2 kA/m (2 kOe), magnetization inversion was assisted by the application of the microwave magnetic field, and information was recorded (magnetization inversion occurred). Meanwhile, in the above-described example, since the recording magnetic field was applied in the thickness direction of the magnetic layer, the recording method was vertical recording.

5. Production of Magnetic Recording Medium Sample No. 5 for Multiplex Recording

A magnetic recording medium sample No. 5 was produced in the same manner as the magnetic recording medium sample No. 3 except for the fact that a half amount (mass-based) of ferromagnetic powder No. C was changed to ferromagnetic powder No. D. In the magnetic recording medium sample No. 5, 50% by mass of the ferromagnetic powder was ferromagnetic powder No. C, and the remaining 50% by mass was ferromagnetic powder No. D.

As a result of measuring the intrinsic ferromagnetic resonance frequency of the magnetic recording medium sample No. 5 using the method described in the section 3, two intrinsic ferromagnetic resonance frequencies were confirmed at 30.1 GHz and 38.5 GHz. From the comparison with the intrinsic ferromagnetic resonance frequencies of the magnetic recording medium samples No. 3 and 4 which included only one type of ferromagnetic powder shown in Table 2, it can be confirmed that the intrinsic ferromagnetic resonance frequency of 30.1 GHz was generated by the ferromagnetic powder No. C, and the intrinsic ferromagnetic resonance frequency of 38.5 GHz was generated by the ferromagnetic powder No. D.

6. Microwave Assisted Recording into Magnetic Recording Medium Sample No. 5

In the magnetic recording medium sample No. 5, as a result of applying a magnetic field (recording magnetic field) of a magnetic field intensity of 159.2 kA/m (2 kOe) in the negative direction after the magnetization of the magnetic layer was saturated by applying a magnetic field in the positive direction, two absorption peak frequencies were confirmed at 26.5 GHz and 34.0 GHz which were frequencies lower than the intrinsic ferromagnetic resonance frequencies (30.1 GHz and 38.5 GHz). From this result, it can be confirmed that, in the magnetic recording medium sample No. 5, magnetization inversion (the recording of information) did not occur only by the application of a recording magnetic field of a magnetic field intensity of 159.2 kA/m (2 kOe).

Next, in the magnetic recording medium sample No. 5, after the magnetization of the magnetic layer was saturated by applying a magnetic field in the positive direction, a microwave magnetic field of a frequency of 26.5 GHz was applied for 100 ns (nanoseconds) through an amplifier in a state in which a magnetic field (recording magnetic field) of a magnetic field intensity of 159.2 kA/m (2 kOe) was applied in the negative direction. After that, as a result of measuring the absorption peak frequency of the magnetic layer, the absorption peak frequency was confirmed only at a frequency of near 35.0 GHz. The absorption peak frequency of 35.0 GHz is considered to be generated by the fact that an absorption peak frequency which was changed from the intrinsic ferromagnetic resonance frequency (30.1 GHz) generated by the ferromagnetic powder No. C and the intrinsic ferromagnetic resonance frequency (38.5 GHz) generated by the ferromagnetic powder No. D appeared in almost the same frequency region. From this fact, it can be confirmed that the magnetization of the ferromagnetic powder No. C was selectively inverted by the application of the microwave magnetic field, that is, information was selectively recorded in the ferromagnetic powder No. C. In addition, the magnetization of the ferromagnetic powder No. D can be selectively inverted by assisting magnetization inversion by means of the application of a microwave magnetic field of a frequency that is different from the frequency of the above-described microwave magnetic field to the magnetic recording medium sample No. 5. When the magnetization of the ferromagnetic powder No. D is selectively inverted as described above, different type of information can be recorded on the same single layer of the magnetic layer by recording information by means of the application of a magnetic field (recording magnetic field) that is different from the magnetic field used to selectively invert the magnetization of the ferromagnetic powder No. C.

Meanwhile, regarding the retrieval of information, a method for retrieving information recorded on a multilayer film having a different absorption peak frequency is described in T. Yang, H. Suto, T. Nagasawa, K. Kudo, K. Mizushima, R. Sato, "Journal of Magnetism and Magnetic Materials" 332 (2013), pp. 52-55. Such a retrieval method can also be used for the retrieval of information recorded in magnetic recording media including different ferromagnetic powders in the same single layer of a magnetic layer.

In the above-described example, the magnetic recording medium samples in which a thermally oxidized film-attached silicon substrate was used as the non-magnetic support and a single layer of the magnetic layer was formed on this non-magnetic support were used. However, this aspect is merely an example, and, as described above, the magnetic recording medium according to the aspect of the present invention may employ a variety of constitutions in which a magnetic layer exhibiting an intrinsic ferromagnetic resonance frequency of 30.0 GHz or more is provided on a non-magnetic support directly or indirectly through a non-magnetic layer.

INDUSTRIAL APPLICABILITY

The present invention is useful in the technical field of magnetic recording media for high-density recording.

What is claimed is:

1. A magnetic recording medium for microwave assisted recording comprising:
a magnetic layer including ferromagnetic powder and a binder on a non-magnetic support,
wherein the magnetic layer is a single layer of a magnetic layer exhibiting two or more different intrinsic ferromagnetic resonance frequencies of 30.0 GHz or more,
the magnetic layer comprises two or more different kinds of ferromagnetic powder,
the different kinds of ferromagnetic powder have different coercive forces from each other, and
the coercive forces are 210 kA/m or more.

2. The magnetic recording medium for microwave assisted recording according to claim 1,
wherein the two or more different kinds of ferromagnetic powder are metallic oxide powders.

3. The magnetic recording medium for microwave assisted recording according to claim 2,
wherein the metallic oxide powders are ferrite powders.

4. The magnetic recording medium for microwave assisted recording according to claim 1,
wherein the two or more different intrinsic ferromagnetic resonance frequencies exhibited by the magnetic layer are both in a range of 30.0 to 50.0 GHz.

5. A magnetic recording device comprising:
a magnetic recording medium; and
a magnetic head for microwave assisted recording,
wherein the magnetic recording medium has a magnetic layer including ferromagnetic powder and a binder on a non-magnetic support,
the magnetic layer is a single layer of a magnetic layer exhibiting two or more different intrinsic ferromagnetic resonance frequencies of 30.0 GHz or more,
the magnetic layer comprises two or more different kinds of ferromagnetic powder,
the different kinds of ferromagnetic powder have different coercive forces from each other, and
the coercive forces are 210 kA/m or more, and
the magnetic head for microwave assisted recording records two or more different types of information on the magnetic layer by means of microwave assisted recording including application of a microwave magnetic field of two or more different frequencies to the magnetic layer.

6. The magnetic recording device according to claim 5,
wherein the two or more different kinds of ferromagnetic powder are metallic oxide powders.

7. The magnetic recording device according to claim 6,
wherein the metallic oxide powders are ferrite powders.

8. The magnetic recording device according to claim 5, wherein the two or more different intrinsic ferromagnetic resonance frequencies exhibited by the magnetic layer are both in a range of 30.0 to 50.0 GHz.

\* \* \* \* \*